US006264045B1

(12) United States Patent
Wilson et al.

(10) Patent No.: US 6,264,045 B1
(45) Date of Patent: Jul. 24, 2001

(54) HIGH PERFORMANCE FILTERS COMPRISING AN INORGANIC COMPOSITE SUBSTRATE AND INORGANIC FIBER WHISKERS

(75) Inventors: Doug Wilson, Laguna Beach; Raj Mathur, Huntington Beach, both of CA (US)

(73) Assignee: Hitco Carbon Composites, Inc., Gardena, CA (US)

( * ) Notice: Subject to any disclaimer, the term of this patent is extended or adjusted under 35 U.S.C. 154(b) by 0 days.

(21) Appl. No.: 09/087,404

(22) Filed: May 29, 1998

Related U.S. Application Data

(60) Provisional application No. 60/048,273, filed on Jun. 2, 1997.

(51) Int. Cl.$^7$ .................................................. B01D 29/54

(52) U.S. Cl. .............. 210/491; 210/500.23; 210/500.25; 210/500.26; 210/502.1; 210/503; 210/505; 428/306.6; 428/307.3; 428/312.2; 428/312.6; 428/317.9; 428/318.4; 428/319.1; 428/408; 428/446; 428/698; 501/87; 501/88; 501/90; 501/94; 501/95.1; 501/95.2; 501/95.3; 502/224; 502/229; 502/527.12

(58) Field of Search ............................. 210/500.23, 491, 210/500.25, 500.26, 500.27, 502.1, 503, 505; 428/408, 306.6, 307.3, 312.2, 312.6, 317.9, 318.4, 319.1, 698, 446; 501/94, 95.1, 95.2, 95.3, 96, 97, 87, 88, 90; 502/224, 229, 326, 527.12

(56) References Cited

U.S. PATENT DOCUMENTS

| | | |
|---|---|---|
| 3,174,895 | 3/1965 | Gibson et al. ........................ 161/259 |
| 3,458,329 | 7/1969 | Owens et al. .......................... 106/39 |
| 3,462,289 | 8/1969 | Rohl et al. ............................. 117/46 |
| 3,510,394 | 5/1970 | Cadotte ................................. 162/145 |
| 3,591,010 | 7/1971 | Pall et al. .............................. 210/493 |
| 4,225,569 | 9/1980 | Matsui et al. ......................... 423/445 |
| 4,231,768 | 11/1980 | Seibert et al. ........................... 55/179 |
| 4,256,607 | 3/1981 | Yoshida et al. ....................... 252/117 |
| 4,284,612 | 8/1981 | Horne, Jr. et al. ................... 423/345 |
| 4,391,787 | 7/1983 | Tibbetts .............................. 423/447.3 |
| 4,412,937 | 11/1983 | Ikegami et al. ....................... 502/423 |
| 4,491,569 | 1/1985 | Tibbetts .............................. 423/447.3 |
| 4,497,788 | 2/1985 | Bradley et al. ..................... 423/447.3 |
| 4,500,328 | 2/1985 | Brassell et al. ........................... 55/97 |
| 4,552,786 | * 11/1985 | Berneburg et al. . |
| 4,565,683 | 1/1986 | Yates et al. ........................ 423/447.3 |
| 4,565,684 | 1/1986 | Tibbetts et al. .................... 423/447.3 |
| 4,663,230 | 5/1987 | Tennent ................................ 428/367 |

(List continued on next page.)

*Primary Examiner*—W. L. Walker
*Assistant Examiner*—Michael Fleming
(74) *Attorney, Agent, or Firm*—Renner, Kenner, Greiver, Bobak, Taylor & Weber

(57) ABSTRACT

A filter media system, which is capable of operating in the microfiltration regime, offers: low cost, durability, high temperature and chemical resistance, no particulation, mechanical strength, separation efficiency, and biocompatibility. A filter media system is comprised of a carbon or ceramic composite substrate which contains a carbon or ceramic matrix reinforced with carbon or ceramic fibers. The composite has an array of carbon or ceramic fiber whiskers grown onto its surface or in its bulk. A process is provided for manufacturing the filter media system wherein a carbon fiber is disposed in a matrix deposited by a CVI or LPI process, at temperatures of about 900 to about 1200° C. to achieve a weight gain of about 10 to 200% (the ceramic matrix is deposited by a CVI process from an aqueous slurry or by use of a preceramic polymer). This composite is treated with an aqueous solution of metal catalyst salt and is then heated in hydrogen at elevated temperatures to reduce the metal salt to metal. Whiskers are then grown on the surface or in the bulk of the catalyst deposited composite such as by decomposition of methane gas using metal catalyzed chemical vapor deposition (CVD).

9 Claims, 3 Drawing Sheets

U.S. PATENT DOCUMENTS

| | | | |
|---|---|---|---|
| 4,749,557 | 6/1988 | Yetter et al. | 423/447.3 |
| 4,772,508 | 9/1988 | Brassell | 428/218 |
| 4,806,206 | 2/1989 | Kamijo et al. | 162/145 |
| 4,818,612 | 4/1989 | Hara et al. | 428/367 |
| 4,842,909 | 6/1989 | Brassell | 428/34.1 |
| 4,855,122 | 8/1989 | Kitamura et al. | 423/447.1 |
| 4,865,739 | 9/1989 | Bauer et al. | 210/490 |
| 4,917,941 | 4/1990 | Hillig | 428/283 |
| 4,944,996 | 7/1990 | Bauer et al. | 428/307.7 |
| 4,956,316 | 9/1990 | Sawyer | 501/88 |
| 4,963,640 | 10/1990 | Dewhurst | 528/73 |
| 4,968,467 | 11/1990 | Zievers | 264/62 |
| 4,986,914 | 1/1991 | Franks | 210/502.1 |
| 4,990,165 | 2/1991 | Bikson et al. | 55/158 |
| 4,992,318 | 2/1991 | Gadkaree | 428/114 |
| 5,024,818 | 6/1991 | Tibbetts et al. | 423/447.3 |
| 5,053,107 | 10/1991 | Barber, Jr. et al. | 162/145 |
| 5,071,631 | 12/1991 | Takabatake | 423/445 |
| 5,080,963 | 1/1992 | Tatarchuk et al. | 428/225 |
| 5,091,164 | 2/1992 | Takabatake | 423/445 |
| 5,098,454 | 3/1992 | Carpentier et al. | 55/523 |
| 5,102,745 | 4/1992 | Tatarchuk et al. | 428/605 |
| 5,114,762 | 5/1992 | Bontems et al. | 428/34.5 |
| 5,124,856 | 6/1992 | Brown et al. | 360/97.03 |
| 5,149,584 | 9/1992 | Baker et al. | 428/297 |
| 5,165,909 | 11/1992 | Tennent et al. | 423/447.3 |
| 5,171,560 | 12/1992 | Tennent | 423/447.3 |
| 5,183,546 | 2/1993 | Oren et al. | 204/290 |
| 5,192,473 | 3/1993 | Hruska et al. | 264/102 |
| 5,196,120 | 3/1993 | White | 210/504 |
| 5,198,007 | 3/1993 | Moyer et al. | 55/523 |
| 5,230,960 | 7/1993 | Iizuka | 428/408 |
| 5,231,061 | 7/1993 | Devore | 501/95 |
| 5,254,396 | 10/1993 | Takemura et al. | 428/225 |
| 5,283,113 | 2/1994 | Nishimura et al. | 428/280 |
| 5,353,949 | 10/1994 | Seibert et al. | 220/371 |
| 5,368,633 | 11/1994 | Foldyna et al. | 95/19 |
| 5,372,380 * | 12/1994 | Duffy et al. | |
| 5,374,415 | 12/1994 | Alig et al. | 423/447.3 |
| 5,376,598 | 12/1994 | Preedy et al. | 501/89 |
| 5,389,400 | 2/1995 | Ting et al. | 427/249 |
| 5,398,840 | 3/1995 | Luhman et al. | 220/563 |
| 5,413,773 | 5/1995 | Tibbetts et al. | 423/447.3 |
| 5,413,866 | 5/1995 | Baker et al. | 423/447.3 |
| 5,433,906 | 7/1995 | Dasch et al. | 264/117 |
| 5,458,181 | 10/1995 | Corbett et al. | 164/97 |
| 5,458,784 | 10/1995 | Baker et al. | 210/674 |
| 5,482,773 | 1/1996 | Bair et al. | 428/368 |
| 5,492,677 | 2/1996 | Yoshikawa | 422/174 |
| 5,578,543 | 11/1996 | Tennent et al. | 502/180 |
| 5,589,152 | 12/1996 | Tennent et al. | 423/447.3 |
| 5,594,060 | 1/1997 | Alig et al. | 524/496 |
| 5,604,037 | 2/1997 | Ting et al. | 428/408 |
| 5,618,875 | 4/1997 | Baker et al. | 524/495 |
| 5,626,650 | 5/1997 | Rodriguez et al. | 95/116 |
| 5,650,370 | 7/1997 | Tennent et al. | 502/174 |
| 5,653,951 | 8/1997 | Rodriguez et al. | 423/439 |
| 5,691,054 | 11/1997 | Tennent et al. | 428/359 |
| 5,707,916 | 1/1998 | Snyder et al. | 502/180 |
| 5,735,332 * | 4/1998 | Ritland et al. | |
| 5,744,236 | 4/1998 | Rohrbach et al. | 428/372 |
| 5,759,394 | 6/1998 | Rohrbach et al. | 210/264 |
| 5,780,126 | 7/1998 | Smith et al. | 428/34.5 |
| 5,800,706 | 9/1998 | Fischer | 210/198.2 |
| 5,888,393 | 3/1999 | Luhman et al. | 210/510.1 |
| 5,922,300 * | 7/1999 | Nakajima et al. | 423/346 |
| 5,985,112 | 11/1999 | Fischer | 204/283 |

\* cited by examiner

HIGH PERFORMANCE FILTERS COMPRISING AN INORGANIC COMPOSITE SUBSTRATE AND INORGANIC FIBER WHISKERS

CROSS-REFERENCE TO RELATED APPLICATIONS

This application claims the benefit of U.S. Provisional Patent Application No. 60/048,273, filed Jun. 2, 1997.

FIELD OF THE INVENTION

The present invention is directed to novel high performance filters having characteristics suitable for use in various filtration applications, such as microfiltration. More particularly, this invention is directed to a novel high performance filter media system comprising a fiber reinforced matrix composite that is low in cost, durable, resistant to chemicals and high temperatures, not subject to particulation, high in mechanical strength and separation efficiency, and biocompatible.

BACKGROUND OF THE INVENTION

The prior art provides many types of materials which remove, filter, or capture gases and particulate materials. These filters of the art, while fairly effective in the applications for which they were designed, do not offer the efficiency, performance, and durability demanded by new, high performance applications.

The demand for higher quality materials, reduced manufacturing costs, and environmentally clean processes is forcing industry to move away from traditional methods of separation and purification, such as distillation and pasteurization, towards the use of filtration. Filter systems are now capable of offering low energy, more efficient, and environmentally friendly operations. Unfortunately, the widespread use of high performance filtration is restricted by the lack of suitable filter media materials. Such media must offer low cost; durability; chemical resistance, particularly to acids and alkalis; resistance to high temperatures, for both operation and sterilization purposes; no particulation (i.e., release of filter media particles into the filtrate stream); mechanical strength to cope with pressure swings; separation efficiency, particularly for particles in the 0.1 to 100 microns range; and biocompatibility for certain applications such as the filtration of blood.

Table 1 below lists the currently available filter media materials together with their advantages and disadvantages.

TABLE 1

Currently Available Filter Media Materials

| Material | Applications material is suitable for | Maximum Operating Temp. (° C.) | Principle Advantages | Principle Disadvantages |
|---|---|---|---|---|
| Cotton | Aqueous solutions, oils, fats, and waxes | 90 | Inexpensive | Subject to fungal attack |
| Nylon | Acids, petrochemicals, and solvents | 150 | High strength and flexibility; long life, and good solids discharge | Absorbs water and subject to attack by alkalis |
| Polyester | Acids, common organic solvents, and oxidizing agents | 100 | Good strength and flexibility | Subject to attack by alkalis |
| PVC | Acids and alkalis | 90 | | May become brittle; and poor heat resistance |
| PTFE | Virtually all chemicals | 200 | Extreme chemical resistance | High cost |
| Polyethylene | Acids and alkalis | 70 | | Softens at moderate temperatures |
| Polypropylene | Acids, alkalis, and solvents (except aromatics and chlorinated solvents) | 130 | | Not suitable for use with aromatics and chlorinated solvents |
| Glass fiber | Concentrated hot acids, and chemical solutions | 250 | Wide range of hot or cold solvents | Subject to attack by alkalis and some acids |
| Stainless Steel | Most environments | >300 | Good resistance to most environments | Expensive and size range limitations |
| Ceramics | Most environments | 1000 | Good resistance to most environments | Expensive and complex manufacturing methods required; and poor durability |

As presented in Table 1, no one filtration material offers the required balance of properties needed for new, high performance applications.

Ceramic filter media have made some inroads, however their acceptance is hampered by the following: high cost because expensive and complex manufacturing processes are required; susceptibility to attack by alkalis; limited durability because of their inherent brittleness; and difficulties in controlling pore size distribution and permeability, which are critical aspects of high performance filter media.

High temperature composite materials, in which a ceramic or carbon matrix is reinforced with a continuous fiber, are used in a variety of applications. They are most commonly used in aircraft brakes. In this application, the braking material is made from a carbon matrix reinforced with carbon fibers (carbon/carbon or C/C). Such materials have a high mechanical strength and are capable of operating at extreme temperatures, up to 3000° C. in a non oxidizing atmosphere. Composites in which both the reinforcing fiber and the matrix are both ceramic are used in specialty applications. In particular, they are used in aircraft engine parts where strength at high temperatures and low weight are needed.

Such high temperature composite materials do offer some potential for use as filter media. For example, carbon/carbon composites, due to the excellent balance of properties, have found use as a filter support. U.S. Pat. No. 4,944,996 discloses the use of a carbon/carbon support intended to receive a mineral membrane for separation procedures. U.S. Pat. No. 4,500,328 discloses the use of carbon/carbon composites to filter radioactive waste, and the use of activated carbon fiber to increase surface area. U.S. Pat. No. 5,183,546 discloses an electrochemical filter consisting of an electrically conductive fibrous material that contains microscopic particles of carbon or active charcoal.

Ceramic matrix composites have been used as hot gas filters. U.S. Pat. No. 4,968,467 discloses the use of refractory ceramic fibers matted together with a high temperature binder, such as colloidal alumina or silica, to form a tube like "candle filter." U.S. Pat. No. 5,196,120 discloses the use of a ceramic fiber-ceramic composite filter composed of ceramic fibers, preferably texturized, a carbonaceous layer thereover, and a silicon carbide coating over the carbonaceous layer, which coats substantially all of the fibers. A strong, light weight filter is achieved.

Despite the advances made in the art, of which the above are examples, ceramic and carbon based composite materials have not previously been suited to high performance filtration. This is especially true for microfiltration because of the difficulties in achieving the required porosity, surface area and permeability required for efficient separation. In general, pore size distribution and the ability of the filter to retain or capture particulate matter is a function of the fiber diameter (*Filters and Filtration Handbook*, Third Edition, 1992). In the art outlined above, fiber diameters range from 7 microns for conventional carbon fibers to 100 microns and above for some ceramic fibers. The diameters of such fibers are too large. These fibers do not provide the small pores required for efficient small particulate retention.

U.S. Pat. No. 5,138,546 discloses the addition of small carbon or charcoal particles which improves surface area and particle capture ability. However, this type of filter is not suitable for most high performance applications, particularly in the foodstuffs and chemical industries. These structures exhibit poor bonding of the particles to the substrate. In addition, there is a tendency for such constructions to particulate, in other words, release undesired particles into the filtrate stream. Also, the addition of such particles can only be performed on a random basis. There is little control with respect to uniformity and positioning.

In light of the disadvantages of the prior art, there is therefore presently a need to develop high performance filter media capable of operating in the microfiltration regime which offer: low cost; durability; chemical resistance, particularly to acids and alkalis; resistance to high temperatures, for both operation and sterilization purposes; no particulation (i.e., release of filter media particles into the filtrate stream); mechanical strength to cope with pressure swings; separation efficiency, particularly for particles in the 0.1 to 100 micron range; and biocompatibility for certain applications, such as the filtration of blood.

SUMMARY OF THE INVENTION

The present invention is directed to a novel high performance filter system having characteristics suitable for use in various filtration applications, such as microfiltration. The filter system consists of a carbon or ceramic composite substrate comprising a carbon or ceramic matrix reinforced with carbon or ceramic fibers and an array of carbon or ceramic fiber whiskers "grown" on the surface of the carbon or ceramic composite substrate. Optionally, the ceramic fiber whiskers may be grown in the bulk of the substrate.

It is therefore an object of the present invention to provide a filter system with a substrate having a high degree of mechanical integrity and stiffness, which is capable of resisting pressure changes with pulsed flows.

It is another object of the present invention to provide a substrate with an open structure that aids in providing a high level of permeability.

It is a another object of the present invention to provide a filter system with whiskers that are grown from the fiber surface and hence are intimately bonded so that particulation is avoided.

It is another object of the present invention to provide a filter system with whiskers that are grown in the bulk of the substrate.

It is another object of the present invention to provide a filter system with a whisker layer, which because of its small fiber whisker size, provides a pore size distribution sufficiently small to trap particles in the range of about 0. 1 to about 100 microns.

It is a further object of the present invention to provide a filter system with a whisker layer, which in the microfiltration range, provides a pore size distribution sufficiently small to trap particles in the range of about 0.2 to about 2 microns.

It is a further object of the present invention to provide a filter system that offers substantial versatility in construction so that a variety of constructions can be produced in order to cope with different filter applications.

It is also an object of the present invention to provide a filter system that is amenable to different forms of filter media such as thin plates, open cylinders, spiral constructions, and corrugated constructions, so that whiskers may be grown where desired (i.e. on the outside or inside the substrate).

It is a further object of the present invention to grow the whiskers in a grid or strip pattern on the surface to promote turbulent mixing and therefore better separation characteristics.

It is another object of the present invention to provide a process for manufacturing the inventive filter system which has the ability to position the whiskers where they are needed.

The manufacturing process of the present invention enables the whiskers to be grown in a specific location. This is important in various filter configurations, and is a distinct advantage over the prior art.

The invention includes a filter media system comprising a carbon or ceramic composite substrate which contains a carbon or ceramic matrix reinforced with carbon or ceramic fibers. The composite has an array of carbon or ceramic fiber whiskers grown onto its surface, or within the bulk of the composite.

The invention also includes a process for manufacturing the filter media system wherein a carbon fiber is provided that has been woven into a fabric, and a carbon matrix is deposited by a chemical vapor infiltration (CVI) or a liquid pressure infiltration (LPI) process (the ceramic matrix is deposited onto ceramic fiber reinforcement by a CVI process, from an aqueous slurry, or by use of a pre-ceramic polymer) at temperatures of about 900 to about 1200° C., to achieve a weight gain of about 10 to 200%. This composite is treated with a solution of a metal catalyst salt, preferably comprising nickel chloride or ferric chloride, and is then heated in hydrogen at elevated temperatures to reduce the metal salt to metal. In one embodiment carbon whiskers are then grown on the surface of the nickel coated composite by decomposition of methane gas at about 1000° C., in one embodiment, for approximately two hours. The fiber whiskers are grown on the composite surface using metal catalyzed chemical vapor deposition (CVD).

In one embodiment, the present invention provides a process for manufacturing a filter media system comprising a carbon composite substrate which comprises a carbon matrix reinforced with carbon fibers, wherein an array of carbon fiber whiskers have been grown onto said substrate, comprising:

a) providing the carbon fiber reinforcement, preferably which has been woven into a fabric of selected weave style;

b) depositing the carbon matrix by one of chemical vapor infiltration (CVI) and liquid pressure infiltration (LPI) process at temperatures of about 900 to about 1200° C. in order to achieve a weight gain of about 10 to about 200%;

c) treating the composite with a solution of metal catalyst salt;

d) heating the composite in hydrogen at elevated temperatures to reduce the metal salt to metal; and e) initiating whisker growth on at least one of the surface and the bulk of the metal deposited composite by decomposition of low molecular weight hydrocarbon gas at elevated temperature, (preferably at about 1000° C. for an effective period of time, in one embodiment being about two hours).

The present invention further provides a process for manufacturing a filter media system comprising a ceramic composite substrate which comprises a ceramic matrix reinforced with ceramic fibers, wherein an array of ceramic fiber whiskers have been grown onto said substrate, comprising:

a) densifying the ceramic fiber with a precursor in order to deposit a ceramic matrix to produce a composite;

b) treating the composite with a solution of metal catalyst salt;

c) heating the composite in hydrogen at elevated temperatures to reduce the metal salt to metal; and d) initiating whisker growth on at least one of the surface and the bulk of the metal coated composite by subjecting the composite to a whisker precursor.

BRIEF DESCRIPTION OF DRAWINGS

FIG. 2A is a cross section of a thin, flat plate filter system.

FIG. 2B is a cross section of an open cylinder filter system.

FIG. 2C is a cross section of a spiral construction for filter media, held in a cartridge.

FIG. 2D is a cross section of a corrugated construction for filter media.

DETAILED DESCRIPTION OF THE INVENTION

Figure 1:
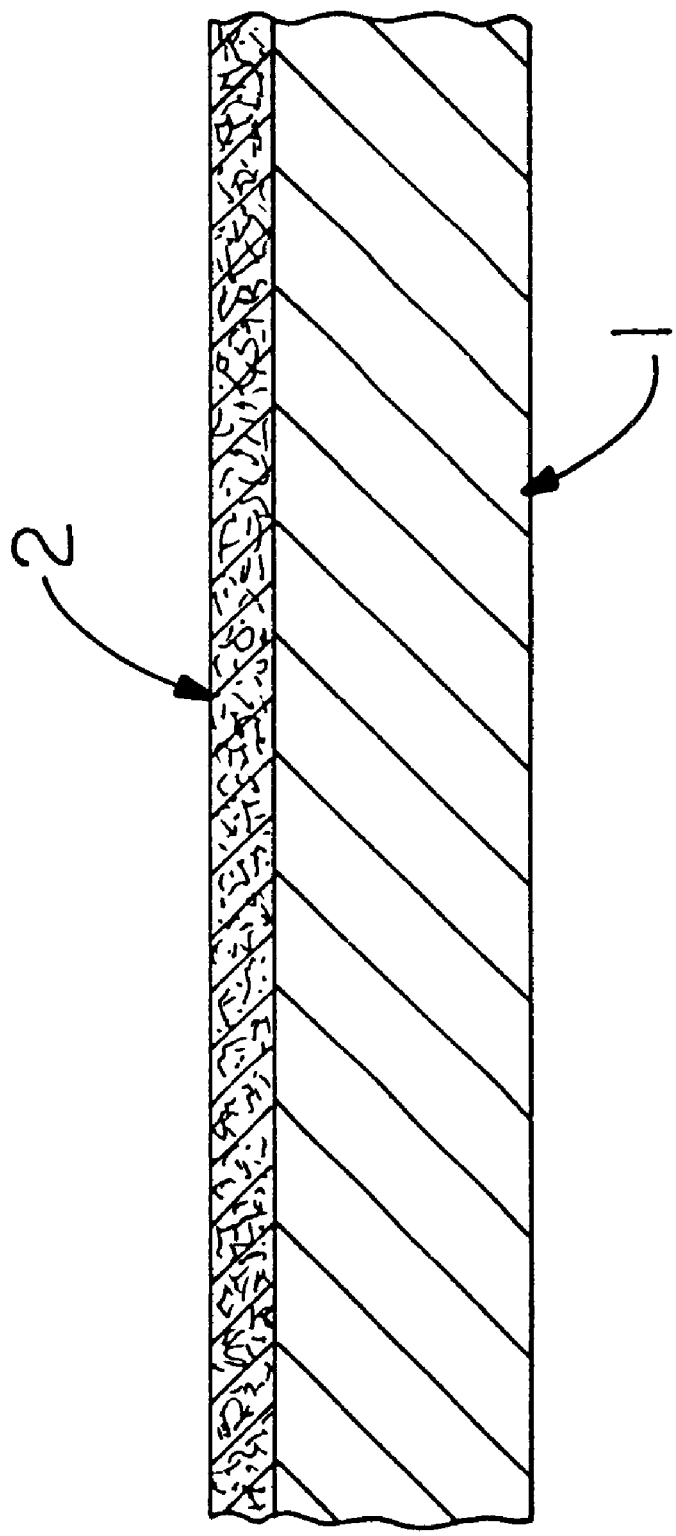
FIG. 1 is a cross-sectional diagram of the filter system which comprises a carbon or ceramic composite substrate comprising a carbon or ceramic matrix reinforced with carbon or ceramic fibers and an array of carbon or ceramic fiber whiskers "grown" on the surface of the carbon or ceramic composite substrate.

Carbon fiber reinforced carbon matrix materials, or carbon/carbon composites, have thermal stability, high resistance to thermal shock due to high thermal conductivity and low thermal expansion behavior (that is, thermal expansion coefficient or TEC), and have high toughness, strength and stiffness in high-temperature applications. Carbon/carbon composites comprise carbon reinforcements mixed or contacted with matrix precursors to form a "green" composite (a pre-preg), which is then carbonized to form the carbon/carbon composite. They may also comprise carbon reinforcements (a dry pre-form) in which the matrix is introduced fully or in part by chemical vapor infiltration.

The carbon reinforcements are commercially available from Amoco, DuPont, Hercules, and others, and can take the form of continuous fiber, chopped fiber, cloth or fabric, chopped cloth or fabric (referred to as moulding compounds), yarn, chopped yarn, and tape (unidirectional arrays of fibers). Yarns may be woven in desired shapes by braiding, knitting, or by multidirectional weaving. The yarn, cloth and/or tape may be wrapped or wound around a mandrel to form a variety of shapes and reinforcement orientations. The fibers may be wrapped in the dry state or they may be impregnated with the desired matrix precursor prior to wrapping, winding, or stacking. Such prepreg and woven structures reinforcements are commercially available from various sources, including Fiberite, Hexcel, and Cytek. The reinforcements are prepared from precursors such as polyacrylonitrile (PAN), rayon or pitch.

Matrix precursors which may be used to form carbon/carbon composites according to the present invention via the pre-preg route include liquid sources of high purity carbon, such as phenolic resins and pitch, and gaseous sources, including hydrocarbons such as methane, ethane, propane and the like. Representative phenolics include, but are not limited to, phenolics sold under the trade designations USP 39 and 91LD, such as supplied by Ashland Chemical, and SC1008 such as supplied by Borden Chemical.

The carbon/carbon composites useful in the present invention may be fabricated by a variety of techniques. Conventionally, resin impregnated carbon fibers are autoclave- or press-molded into the desired shape on a tool or in a die. For example, lay-ups of two dimensional (2D) continuous fiber or woven fabrics may be formed on a lay-up tool in the desired shape. The molded parts are heat-treated in an inert environment to temperatures from about 700 to about 2900° C. in order to convert the organic phases to carbon. The carbonized parts are then densified by carbon chemical vapor infiltration (CVI) or by multiple cycle reimpregnations and carbonizations with the resins described above. Other fabrication methods include hot-pressing and the chemical vapor impregnation of dry preforms. Methods of fabrication of carbon/carbon composites which may be used according to the present invention are described in U.S. Pat. Nos. 3,174,895 and 3,462,289, which are incorporated by reference herein.

The filter media system of the present invention comprises a carbon or ceramic composite substrate which contains a carbon or ceramic matrix reinforced with carbon or ceramic fibers. The composite has an array of carbon or ceramic fiber whiskers grown onto it. The composite substrate contains about 10% to about 90% fibers by weight and about 90% to about 10% matrix. The amount of fiber whiskers in the system ranges from about 5% to about 90% by weight of the total system. The fiber whiskers are about 5 to about 25 microns in length and about 0.1 to about 5 microns in diameter. The filter contains interconnected porosity, such that a fluid (gaseous or liquid) can flow through it.

The filter media system of the present invention may also comprise a carbon or ceramic composite substrate which contains a carbon or ceramic matrix reinforced with carbon or ceramic fibers, in which the composite has an array of carbon or ceramic fiber whiskers grown in the bulk of the substrate. The pores in the substrate are doped with a catalyst in order to enable the whiskers to be grown in the bulk of the substrate. A solution of the catalyst can be introduced into the pores, followed by drying and heating as discussed below.

The system may be in the form of a plate, hollow tubes, open cylinders, corrugated plates, or corrugated cylinders. The system's reinforcing fibers are in the form of unidirectional arrays, woven cloths, fabrics, felts, tows, chopped fabrics, chopped tows, and brushed or cut-pile fabrics. The composite substrate may comprise carbon fibers made from PAN, pitch, or rayon precursors. The composite substrate may additionally or alternatively comprise ceramic fibers including silicon carbide, silicon nitride, aluminosilicate, silica, and/or glass. The fiber whiskers comprise carbon, silicon carbide, silicon nitride, titanium carbide, and/or titanium nitride.

The system's whisker configuration may be straight or highly branched and can be grown in a specific location. The fiber whiskers can be grown from the fiber surface, and thus are intimately bonded to the composite substrate, avoiding particulation in use. The filter system is highly permeable, and the pore size distribution is sufficiently small to capture particles in the range of about 0.1 to about 100 microns. This is enabled by the use of small fiber whisker size, preferably about 0.2 microns in diameter. In addition, in the microfiltration range, the filter system provides a pore size distribution sufficiently small to trap particles in the range of about 0.2 to about 2 microns.

The inventive filter system also allows for high purity, and is highly durable. The system, if comprising carbon fibers and whiskers, is capable of operating at temperatures of about 500° C. in air and about 3000° C. in a non-oxidizing atmosphere. The system, if comprising ceramic fibers and whiskers, is capable of operating at temperatures up to about 2000° C. in air and/or in a non-oxidizing atmosphere. The system has high strength sufficient to resist loads imparted by fluctuating pressures. The substrate's open structure also helps to provide a high level of permeability.

The filter media system may be used for microfiltration and may be used to selectively remove unwanted species in milk, fruit juices, beer, and other foodstuffs. The system may also be used to purify blood and to purify chemically aggressive materials comprising acids, alkalis, solvents, and organic chemicals. In addition, the filter system may also be used to remove particulate matter from air.

In one embodiment, the filter media system is manufactured by a process wherein i) carbon fiber is woven into a fabric of a particular weave style; ii) the carbon matrix is deposited by a CVI or LPI process at temperatures of about 900 to about 1200° C. in order to achieve a weight gain of about 10 to 200% to form a composite; iii) this composite is treated with solution of metal catalyst salt, in one embodiment comprising nickel chloride or ferric chloride; iv) the composite is then heated in hydrogen at elevated temperatures to reduce the metal salt to metal; and, v) whisker growth is then initiated on the surface of the nickel coated composite by decomposition of methane gas at about 1000° C. for approximately two hours. The fiber whiskers are grown on the composite surface using metal catalyzed chemical vapor deposition (CVD). Other metal catalysts and reaction conditions for carbon whisker growth are conventional, and may be utilized according to the present invention.

The densification of the reinforcement by deposition of matrix material must not proceed to completely densify the substrate as the filter system must be permeable to the fluid from which it is to filter. The partially densified substrate should therefore have a porosity of about 10% to about 50% before the whiskers are grown and about 5% to about 40% after the whiskers are grown. For example, a composite substrate having 10% porosity may be subjected to catalyzed whisker growth, to achieve a final porosity of 5%. Similarly, a composite substrate having 50% porosity may be subjected to extended catalyzed whisker growth, to achieve a final porosity of 5%.

For high purity filtration, the filter media are made from high purity materials. With regard to carbon/carbon filter media, the purity of the material is provided by using a high purity, corrosion resistant composite including a carbon fiber reinforced carbon matrix having a level of total metal impurity below 10 parts per million (ppm). The composite preferably has a total metal impurity level below 5 ppm, and most preferably below the detection limit of inductively coupled spectroscopy for the metals Ag, Al, Ba, Be, Ca, Cd, Co, Cr, Cu, K, Mg, Mn, Mo, Na, Ni, P, Pb, Sr, and Zn.

In this high purity embodiment, after the composite has been formed by the densification of the carbon fibers, the composite is further heat treated at about 2400° C. to about 3000° C. in a non-oxidizing or inert atmosphere to ensure graphitization of the structure and to remove any impurities that may have been introduced. The period of time for this procedure is calculated based upon graphitization time/temperature kinetics, taking into account furnace thermal load and mass. The composite may be machined, if desired, to precise specifications and tolerances.

Composite purity is established by the use of high purity matrix precursors and carbon black fillers, if any. For example, the phenolic resins used should contain less than 50 ppm metals, should utilize non-metallic accelerators for cure, and preferably should be made in a stainless steel reactor. Processing conditions in the manufacture of the carbon composites are maintained at high standards so as not to introduce any extraneous impurities.

In the chemical vapor infiltration (CVI) of the carbon composite, precautions are taken not to introduce any elemental impurities in the CVI furnace. Prior to processing the carbon composites, the furnace is purged by running an inert gas, such as argon, helium or nitrogen, through it for several heat treat cycles at about 2400° C. to 3000° C.

The purity level stated above does not take into account metal catalyst deposited on the composite substrate for whisker formation. After the whisker formation, the surface metal catalyst can be removed by conventional techniques, such as acid wash, or by removal with a halogen gas at high temperature.

The process for manufacturing the invention has the ability to position the whiskers where they are needed. The manufacturing process enables the whiskers to be grown in a specific location. This is important in various filter configurations, and is a distinct advantage over the prior art. This can be accomplished by selectively depositing the metal salt catalyst by conventional means at the site or sites where such growth is desired.

The filter system offers substantial versatility in construction such that a variety of constructions can be produced in order to cope with different filter applications. The following variations in the fiber whiskers may be made: whisker type (carbon or different types of ceramic); whisker density (whiskers per unit area of substrate); whisker diameter (0.1 to 5 microns); whisker length (1 to 25 microns, and preferably 5 to 15 microns); and whisker configuration (straight or branched). Variations in the substrate may also be made: type of fibrous construction (continuous unidirectional fibers and woven cloths, felts and discontinuous fibers in chopped tows and fabrics; brushed fabrics and felts where individual filaments are exposed can also be used as a route to very high surface area materials); type of fiber (pitch, PAN, or rayon based carbon fiber and various ceramic fibers, such as silicon carbide, silicon nitride, aluminosilicate, silica, glass, and the like); and type of matrix carbon (derived from LPI or CVD).

In one embodiment, the carbon substrate material may be "activated" by conventional techniques, to form a mildly oxidized, high surface area hydrophilic surface. For example, the carbon fiber reinforcements in the composite may be activated by heating the carbon fiber in a mildly oxidizing atmosphere (for example, carbon dioxide) at a temperature up to about 1300° C., preferably activating the fiber at a temperature in the range of about 850° to about 950° C.

In another embodiment, the carbon whiskers which are formed on the carbon or ceramic substrate are activated by conventional carbon activation procedures. The activated carbon whiskers then function effectively as both a filter means and an absorber means. The activated carbon whiskers can therefore both trap particulate matter and absorb small particles or dissolved matter.

In another embodiment, the filter media system comprising a ceramic composite substrate, which comprises ceramic matrix reinforced with ceramic fibers wherein an array of ceramic fiber whiskers have been grown onto said substrate comprising, is manufactured by a process wherein i) the ceramic fiber is densified with a precursor in order to deposit a ceramic matrix, such as silicon carbide; ii) the composite produced in the first step is treated with a solution of metal catalyst salt; iii) the composite is heated in hydrogen at elevated temperatures to reduce the metal salt to metal; and iv) whisker growth is initiated on the surface of the metal coated composite by subjecting the composite to a precursor. Precursors for the ceramic fiber whiskers, and the whisker formation reaction conditions, are conventional in the art. Examples of ceramic matrices suitable for the present invention include, but are not limited to, silicon carbide and silicon nitride, and the like.

The ceramic matrix may be deposited by a CVI process, from an aqueous slurry, or by use of a suitable precursor. The precursor can be selected from the group consisting of methylchlorosilane, alkylchlorosilane, polycarbosilane, and polycarbosilazane.

The inventive filter system is also amenable to being provided in different forms of filter media such as thin plates, open cylinders, spiral constructions, and corrugated constructions, so that whiskers may be grown where desired (i.e. on the outside or inside the substrate). In certain circumstances it may be required to grow the whiskers in a grid or strip pattern on the surface to promote turbulent mixing and therefore better separation characteristics.

Table 2 shows filter performance with respect to a carbon/carbon substrate only and a whiskered carbon/carbon substrate. The whiskered carbon/carbon substrate has high particle retention capabilities whereas a carbon/carbon substrate only does not.

TABLE 2

Whiskered Carbon/Carbon Substrate Performance

| Filter type | Permeability | Particle Retention |
| --- | --- | --- |
| Carbon/Carbon substrate only | High | Low |
| Whiskered Carbon/Carbon substrate | High | High |

FIG. 1 depicts the filter media system which comprises a carbon or ceramic composite substrate 1 comprising a carbon or ceramic matrix reinforced with carbon or ceramic fibers and an array of carbon or ceramic fiber whiskers 2 "grown" on the surface of the carbon or ceramic composite substrate.

Figure 2A:
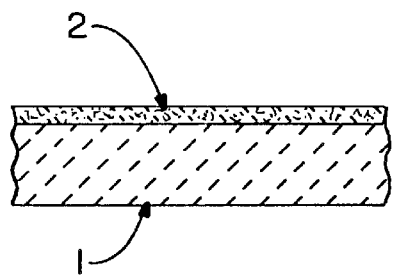
FIG. 2A through D depict various types of filter media configurations to which the present invention is amenable.
Figure 2B:
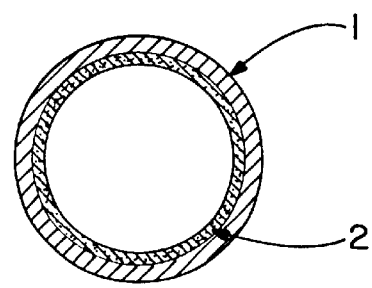
Figure 2C:
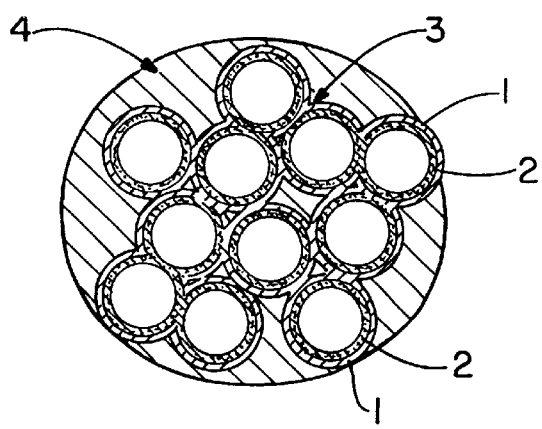
Figure 2D:
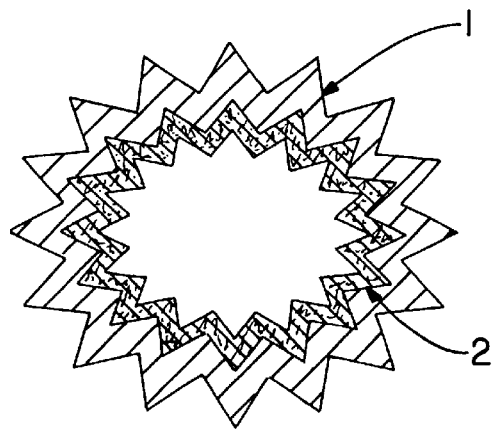

FIG. 2 depicts various types of filter configurations that the invention is amenable to, such different forms of filter media including FIG. 2A thin, flat plates, FIG. 2B open cylinders, FIG. 2C spiral constructions such as hollow fibers or tubes 3 contained in a cartridge 4, and FIG. 2D corrugated constructions.

Figure 3:
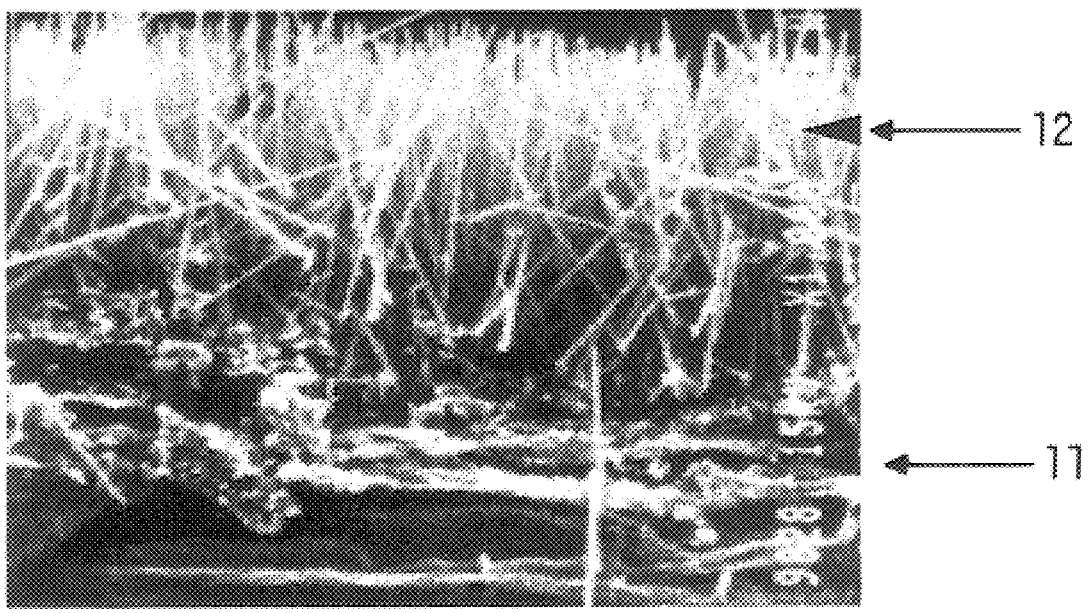
FIG. 3 is a photomicrograph which shows the growth of fiber whiskers on a composite substrate.
Figure 4:
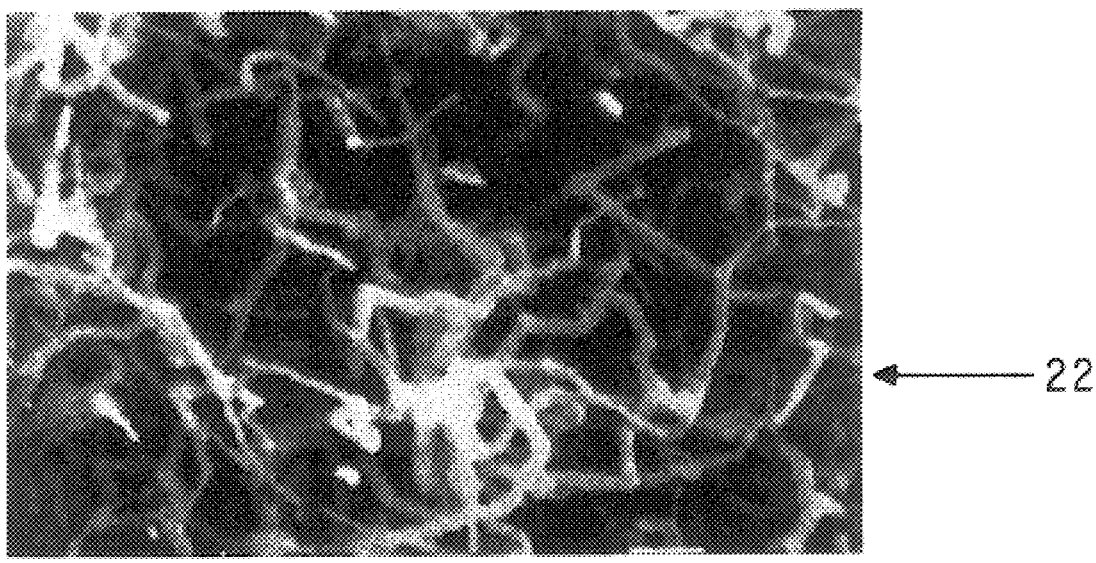
FIG. 4 is a photomicrograph which shows the growth of branched fiber whiskers on a composite substrate.

FIGS. 3 and 4 are photomicrographs showing the growth of the fiber whiskers 12 on the composite substrate 11. In particular, FIG. 3 shows carbon fiber whiskers 12 grown from the surface of a carbon/carbon composite substrate 11. FIG. 4 shows branched carbon fiber whiskers 22.

The present invention therefore provides a filter system with a substrate in various configurations, made from an advanced composite material and having a high degree of mechanical integrity and stiffness, which is capable of resisting pressure changes with pulsed flows.

As an example, carbon whiskers grown on a silica substrate can render the substrate, or filter containing the substrate, conductive, so as to be useful for electrostatic precipitation with the application of an electric field. The active whisker containing filter is therefore useful for capturing particles electrostatically, such as for removing bacteria from the air.

The objects of the present invention are accomplished by the production and use of high purity, high performance carbon/carbon or ceramic/ceramic composite components for use in a filter media system. The advantages of this filter system with respect to low cost, durability, chemical and temperature resistance, particulation, mechanical strength and separation efficiency, and biocompatibility have been demonstrated. It should be understood that the present invention is not limited to the specific embodiments described above, but includes the variations, modifications, and equivalent embodiments that are defined by the following claims.

We claim:

1. A process for manufacturing a filter media system comprising a carbon composite substrate which comprises a carbon matrix reinforced with carbon fibers, wherein an array of carbon fiber whiskers have been grown onto said substrate, comprising:

a) providing the carbon fiber reinforcement;
b) depositing the carbon matrix by one of chemical vapor infiltration (CVI) and liquid pressure infiltration (LPI) process at temperatures of about 900 to about 1200° C. in order to achieve a weight gain of about 10 to about 200%;
c) treating the composite with a solution of metal catalyst salt;
d) heating the composite in hydrogen at elevated temperatures to reduce the metal salt to metal; and
e) initiating whisker growth on at least one of the surface and the bulk of the metal deposited composite by decomposition of low molecular weight hydrocarbon gas at elevated temperature; and wherein the filter media system has an interconnected porosity that is adapted to allow fluid to flow through the filter media system, and a pore size distribution that is adapted to capture particles having a diameter in the range of about 0.1 to about 100 microns.

2. The process in claim 1 wherein the solution of metal catalyst salt is selected from the group consisting of nickel chloride and ferric chloride.

3. The process in claim 1 wherein the whisker growth is initiated on the surface of the catalyst deposited composite by decomposition of a gas selected from the group consisting of ethane, methane, and propane.

4. The process of claim 1 wherein the fiber whiskers are grown on the composite surface using metal catalyzed chemical vapor deposition (CVD).

5. A process for manufacturing a filter media system comprising a ceramic composite substrate which comprises a ceramic matrix reinforced with ceramic fibers, wherein an array of ceramic fiber whiskers have been grown onto said substrate, comprising:

a) densifying the ceramic fiber with a precursor in order to deposit a ceramic matrix to produce a composite;
b) treating the composite with a solution of metal catalyst salt;
c) heating the composite in hydrogen at elevated temperatures to reduce the metal salt to metal; and
d) initiating whisker growth on at least one of the surface and the bulk of the metal coated composite by subjecting the composite to a whisker precursor; and wherein the filter media system has an interconnected porosity that is adapted to allow fluid to flow through the filter media system, and a pore size distribution that is adapted to capture particles having a diameter in the range of about 0.1 to about 100 microns.

6. The process of claim 5 wherein the precursor is selected from the group consisting of methylchlorosilane, alkylchlorosilane, polycarbosilane, and polycarbosilazane.

7. The process of claim 5 wherein the ceramic matrix is selected from the group consisting of silicon carbide and silicon nitride.

8. The process of claim 5 wherein the ceramic fibers are selected from the group consisting of silicon carbide, silicon nitride, aluminosilicate, silica, glass, and mixtures thereof.

9. The process of claim 5 wherein the fiber whiskers are selected from the group consisting of carbon, silicon carbide, silicon nitride, titanium carbide, titanium nitride, and mixtures thereof.

* * * * *